United States Patent
Gray

(10) Patent No.: US 7,717,474 B2
(45) Date of Patent: May 18, 2010

(54) PIPE COUPLING ADAPTOR

(76) Inventor: Eric Gray, 3705 N. Runway Dr., Tucson, AZ (US) 85705

( * ) Notice: Subject to any disclaimer, the term of this patent is extended or adjusted under 35 U.S.C. 154(b) by 238 days.

(21) Appl. No.: 11/566,451

(22) Filed: Dec. 4, 2006

(65) Prior Publication Data
US 2008/0129039 A1   Jun. 5, 2008

(51) Int. Cl.
*F16L 43/00* (2006.01)
(52) U.S. Cl. ............. 285/134.1; 285/129.1; 285/129.2; 403/177
(58) Field of Classification Search ............. 285/122.1, 285/123.1, 125.1, 129.1, 129.2, 130.1, 134.1; 403/177, 192; 148/68.1, 74.2
See application file for complete search history.

(56) References Cited

U.S. PATENT DOCUMENTS

| | | | |
|---|---|---|---|
| 110,114 A * | 12/1870 | Conner ..................... 285/361 |
| 313,393 A * | 3/1885 | Westinghouse, Jr. ......... 48/193 |
| 779,398 A * | 1/1905 | Calkins .................... 196/110 |
| 985,969 A * | 3/1911 | Beckway ..................... 4/211 |
| 993,095 A * | 5/1911 | Nilson ........................ 4/211 |
| 1,417,393 A * | 5/1922 | Lassiter et al. ......... 29/890.147 |
| 1,417,395 A * | 5/1922 | Lassiter et al. ........... 285/134.1 |
| 1,417,396 A * | 5/1922 | Lassiter et al. ........... 285/134.1 |
| 1,427,107 A * | 8/1922 | Kaplan .......................... 4/211 |
| 3,373,452 A * | 3/1968 | Watts ........................... 4/696 |
| 3,670,758 A | 6/1972 | Willinger |
| 3,738,491 A | 6/1973 | Dockery |
| 3,860,269 A * | 1/1975 | Horton et al. ................. 285/47 |
| 4,035,299 A | 7/1977 | Vroeginday |
| 4,761,227 A | 8/1988 | Willinger et al. |
| 4,842,727 A | 6/1989 | Willinger et al. |
| 5,728,293 A | 3/1998 | Guoli et al. |

OTHER PUBLICATIONS

Rob's Reef: ProClear Small Overflow Siphon Box, http://www.robsreet.com/Merchant2/merchant.mvc? Screen=Prod&Store_Code=RR&Product_Code=sm..., printed May 11, 2006.

* cited by examiner

*Primary Examiner*—Aaron M Dunwoody
*Assistant Examiner*—Fannie Kee
(74) *Attorney, Agent, or Firm*—Quarles & Brady LLP; Gavin J. Milczarek-Desai

(57) ABSTRACT

An adaptor for coupling pipes together that has a pair of spaced apart pipe members disposed parallel to each other, with each of pair of pipe members including an opening at a top and at a bottom for receiving an additional pipe, and a bridging member connecting the pair of pipe members and defining a passage between the pipe members. A kit including an adaptor and one or more additional pipe members also is provided.

3 Claims, 4 Drawing Sheets

PIPE COUPLING ADAPTOR

BACKGROUND OF THE INVENTION

1. Field of the Invention

The invention relates to a adaptor that is especially useful for coupling common plumbing components to create an overflow siphon apparatus.

2. Description of the Related Art

A variety of devices are known to exist for coupling pipes together ranging from standard fittings to adhesives. A fitting must provide good connectability, and, depending on the application, access to other pipe components and adequate pressure resistance. Thus, for example, a siphon or overflow box of the type commonly used for aquariums ideally would be made from pipes and fitting that are economical to make, easy to assemble, simple to disassemble for cleaning, and adequately well connected to resist any leaks resulting from the large volume of water constantly moving through these apparatus. However, most siphons or overflow boxes today are made from injection molded or assembled pieces of flat material that are relatively expensive to manufacture and are not easy to disassemble or clean.

U.S. Pat. No. 4,761,227 issued to Willinger et al. discloses a "overflow box-type" aquarium filter that includes an intake chamber for receiving contaminated aquarium water from the aquarium tank and a filter chamber in flow communication with the intake chamber. An impeller serves to draw water from the aquarium tank to the intake chamber through a removable intake U-tube. Upon stoppage of the impeller, the flow of water reverses and flows back into the aquarium tank. While this device may be suitable for its particular purpose, it is unnecessarily complicated and requires that the impeller stops before too much water is drawn into the filter chamber such that overflow occurs.

U.S. Pat. No. 5,728,293 by Guoli et al. discloses a filter assembly that has a generally U-shaped siphon tube that has telescopic legs and a flow regulator that provide for flow between the filter assembly and the aquarium tank. While the U-shaped siphon tube is removable from both the filter area and tank for cleaning, the flow regulator and removable legs make this siphon relatively complex to manufacture and increase the risk that a part of the siphon will be lost or broken from disassembly and handling.

Hence, it would be useful to have a pipe fitting that enables a user to conveniently assemble a siphon from common parts, thus providing an economical and easy to use and clean apparatus.

SUMMARY OF THE INVENTION

The invention relates in general to an adaptor for coupling pipes together. More particularly, the adapter includes a pair of spaced apart pipe members disposed parallel to each other, with each pipe member including an opening at its top and bottom that is adapted to receive an additional pipe. A bridging member connects the pair of pipe members and defines a passage between the pipe members.

In one embodiment of the invention, the adaptor comprises a U-shaped member. The U-shaped member may be substantially flat along a top edge, thereby allowing a second U-shaped pipe to be nested inside the top openings in a manner that provides for fluid flow through the second U-shaped member. In another embodiment, the pair of spaced apart pipe members comprises an H-shaped member.

In still another embodiment of the invention, the adapter includes a pair of spaced apart pipe members disposed parallel to each other, with each pipe member including an opening at its top and bottom that is adapted to receive an additional pipe, and a bridging member that connects the pair of pipe members at a bridge member and defines an open concave passage between the pipe members.

In yet another embodiment of the invention, a kit for coupling pipes together is provided. The kit includes (1) an adaptor having a pair of spaced apart pipe members disposed parallel to each other, with each of the pair of pipe members including an opening at the top, i.e., first end, and bottom, i.e., second end, to receive an additional pipe, and a bridging member connecting the pipe members and defining a passage between them; and (2) at least one additional pipe member adapted for placement within an opening of the pair of pipe members. Preferably, the additional pipe member is adapted for placement within the opening of the pair of pipe members through frictional engagement, such as through a "taper fit" commonly employed in PVC pipe fittings. However, the use of adhesives or male/female threads also may be desired depending on the application.

Additional features and advantages of the invention will be forthcoming from the following detailed description of certain specific embodiments when read in conjunction with the accompanying drawings. For example, the kit of the invention may further include a plurality of additional pipe members that comprise the components of an apparatus, such as an overflow siphon. Hence, the invention is scalable to cover a wide range of application and flow requirements.

DESCRIPTION OF THE PREFERRED EMBODIMENTS

Figure 1:
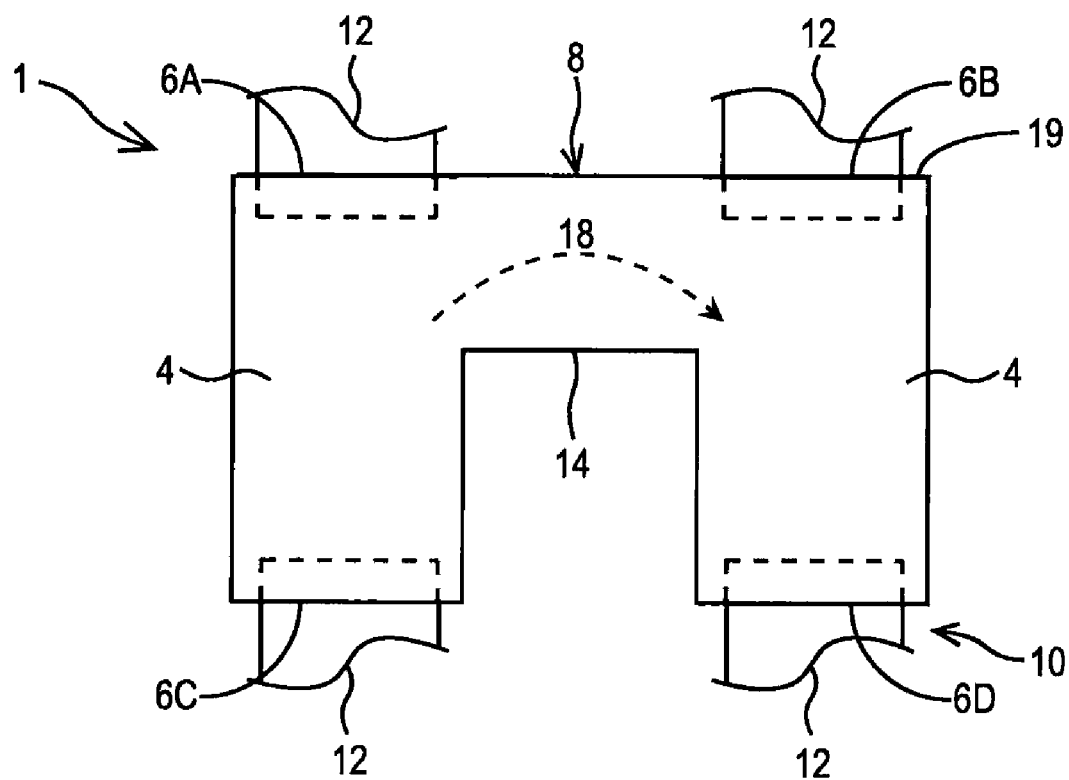
FIG. 1 is side elevational view of a first embodiment of the invention.

Referring to FIG. 1, the numeral 1 refers to a U-shaped adaptor for coupling pipes together. The adaptor includes a pair of spaced apart pipe members 4 disposed parallel to each other, wherein each of the pair of pipe members 4 includes an opening 6A-6D at a top 8 and at a bottom 10 of the pipe members. As shown, each opening 6A-6D is adapted to receive an additional pipe 12.

Figure 3:
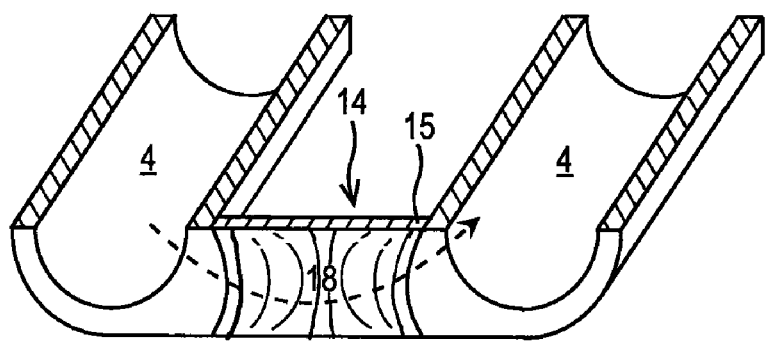
FIG. 3 is a cross-sectional view taken along line 3-3 of the embodiment in illustrated in FIG. 2.
Figure 4:
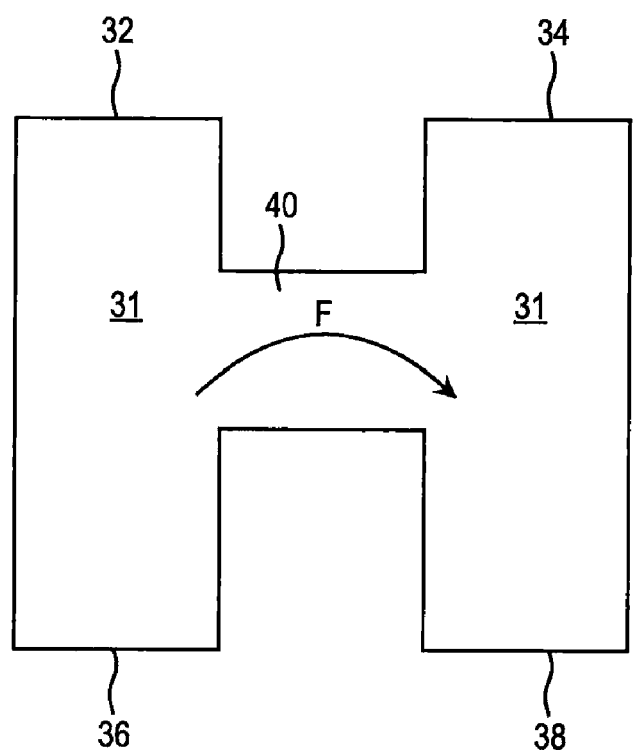
FIG. 4 is a side elevational view of a second embodiment of the invention.

The pair of pipe members 4 are spaced apart by a bridging member 14 that defines a passage 18 between pipe members 4 (the passage 18 being more clearly shown in FIGS. 3 and 4). The purpose of the passage 18 is to provide for fluid flow between pipe members and/or to provide a concave channel for nesting addition pipe structures within the adaptor. Indeed, depending on the additional pipe structure(s), no fluid may flow through the channel 18 (see, for example, FIG. 5). Moreover, the adaptor 1 may be substantially flat along a top edge 19 to best interface or nest with additional structures, such as pipe members 12.

Figure 2:
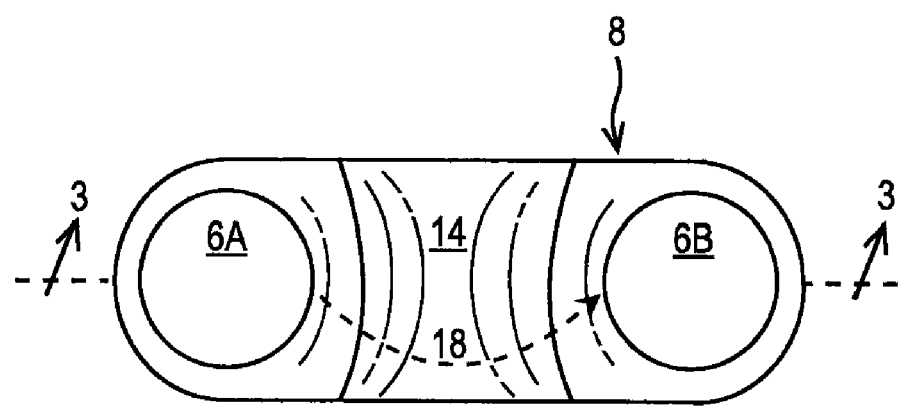
FIG. 2 is a top plan view of the embodiment illustrated in FIG. 1.

Turning to FIG. 2, a top view of the embodiment shown in FIG. 1 is shown. The cross-sectional view of FIG. 3 reveals the bridging member 14 of this embodiment includes both a solid portion 15 and a generally concave passage 18 that is open (i.e., not covered) and through which fluid (indicated by arrows) may flow.

A second embodiment of the invention is illustrated in FIG. 4. As shown, the adaptor comprises a generally H-shaped member 30 that includes a pair of pipes 31 having openings 32, 34, 36 and 38 disposed in parallel and connected by a bridging member 40. As indicated, bridging member 40 may be a open passage that allows fluid F to flow between the pipes 31.

Figure 5:
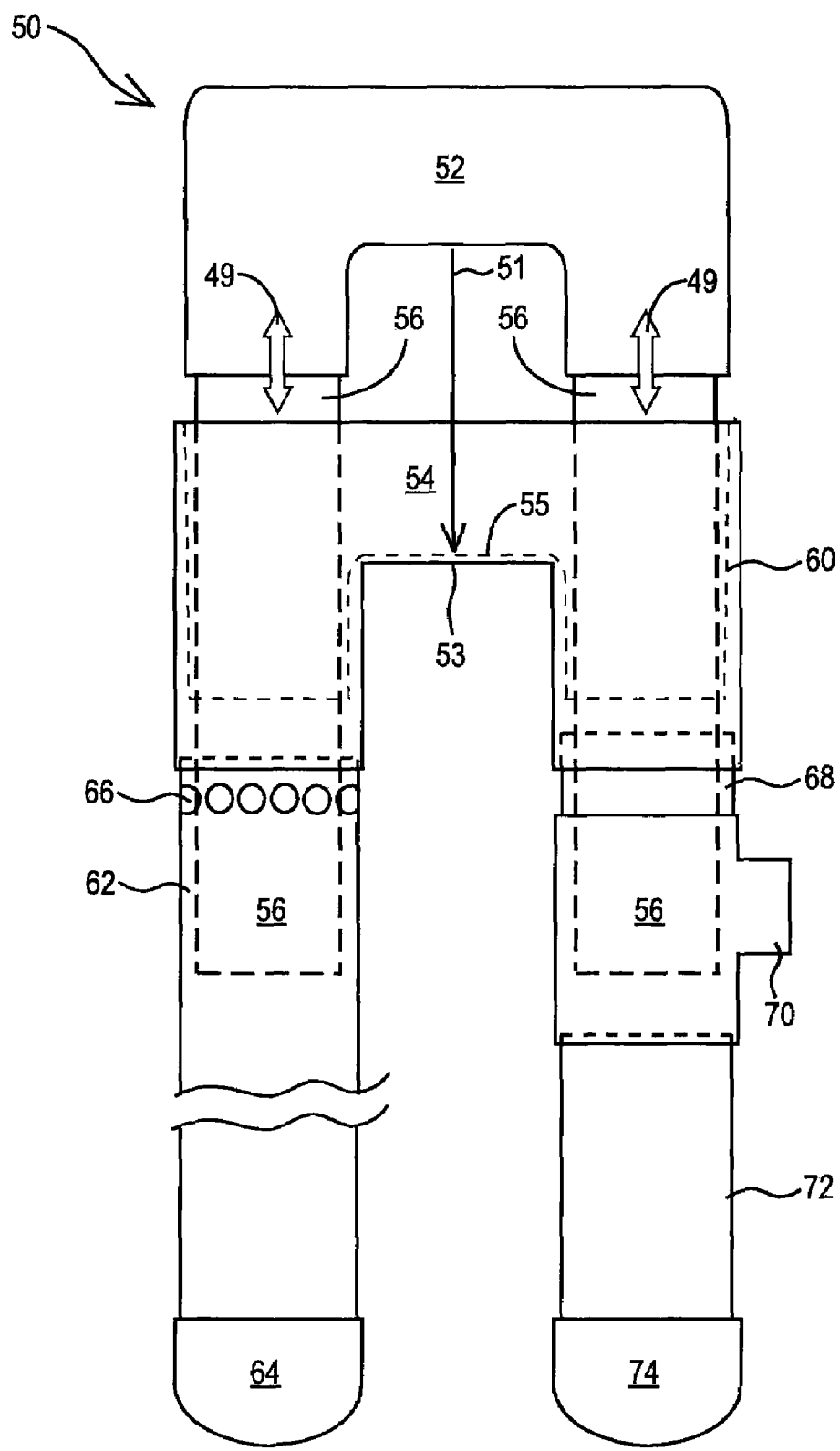
FIG. 5 is a partially assembled side view of a kit embodiment of the invention.
Figure 6:
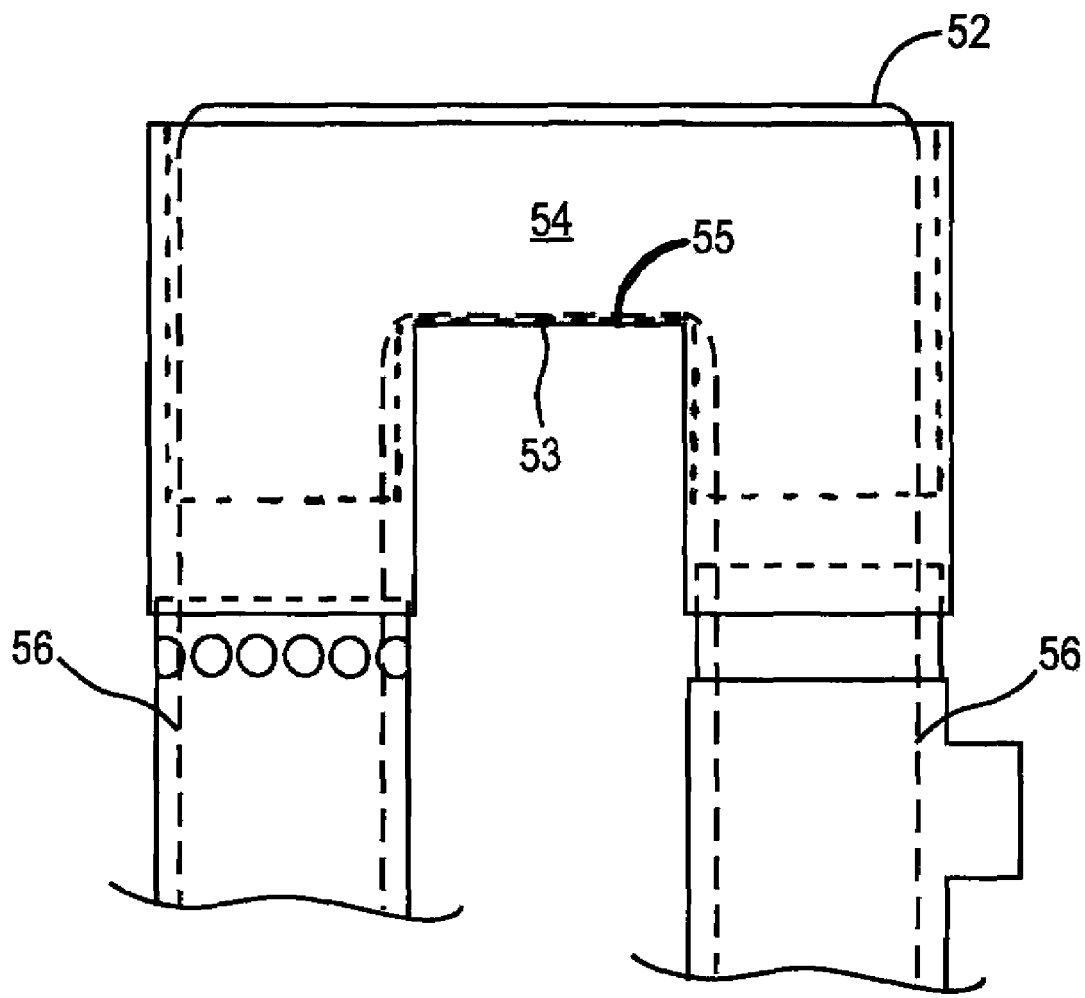
FIG. 6 is a partial view of FIG. 5 and shows the structural arrangement that occurs when member 52 contacts the passage area of the bridging member.

Turning to the embodiment shown in FIG. 5, a kit for coupling pipes together is disclosed. The kit 50 includes an adaptor 54 that is adapted to receive at least one additional pipe member, such as U-shaped member 52 having legs 56. U-shaped member 52 may be frictionally engaged within adaptor 54 through tapered walls 60, thus creating a seal within adaptor 54. Moreover, due to the frictional engagement, U-shaped member 52 also may be removed from adaptor 54 (as indicated by arrows 49). Alternatively, an adhesive, such as PVC cement, may be used to join the each kit component as desired. In this embodiment, when the U-shaped member 52 is nested within adaptor 54 (as depicted by arrow 51), the U-shaped member contacts bridging member 53 along the open concave passage 55.

Additional components may be included in the kit 50. Thus, coupled to the bottom of adaptor 54 is pipe 62, having end cap 64 and openings 66, and pipe 68, which includes T-junction 70, pipe 72 and end cap 74. All of these components, including adaptor 54, may be economically produced and sold as a kit for assembly into an overflow siphon useful for exchanging water between an aquarium tank and filter. Thus, the adaptor of the invention facilitates the coupling of kit components in a simple and low-cost manner.

Various modifications are possible within the meaning and range of equivalence of the appended claims.

I claim:

1. A kit for coupling pipes together, comprising:
a single-piece U-shaped adaptor having a first end and a second end, the U-shaped adaptor comprising a pair of spaced apart pipe members adapted for fluid flow therethrough and disposed parallel to each other and connected by a bridging member that defines inside and proximal to the first end of said U-shaped adaptor a concave passage between said pair of spaced apart pipe members, wherein each of said pair of spaced apart pipe members includes an opening at the adaptor first end and at the adaptor second end, each opening being adapted to receive an additional pipe,
a U-shaped member adapted for fluid flow therethrough, wherein the first end of said adaptor is open such that said U-shaped member contacts said concave passage of said bridging member when said U-shaped member is received within the U-shaped adaptor; and
additional pipe members placed within each opening of said pair of spaced apart pipe members at said adaptor second end, wherein the additional pipe members contact the U-shaped adaptor and are fluidly connected with said U-shaped member.

2. The kit of claim 1, wherein said additional pipe members are placed within said pair of spaced apart pipe members at said U-shaped adaptor second end through frictional engagement.

3. The kit of claim 1, further including a plurality of additional pipe members comprising the components of an overflow siphon.

* * * * *